Patented Dec. 11, 1945

2,390,593

UNITED STATES PATENT OFFICE 2,390,593

DICARBOXYLIC ACID DERIVATIVES OF LOWER ALKYL ETHERS OF VITAMIN B6, AND A PROCESS OF PREPARING THE SAME

John C. Keresztesy, Westfield, and Joseph R. Stevens, Plainfield, N. J., assignors to Merck & Co., Inc., Rahway, N. J., a corporation of New Jersey No Drawing. Application December 16, 1941, Serial No. 423,134

4 Claims. (Cl. 260—295.5)

This invention relates to the dicarboxylic acid derivatives of the lower alkyl ethers of vitamin B6, and a process of preparing the same, and is a continuation-in-part of our co-pending application, Serial No. 247,480, filed December 23, 1938.

We have discovered that the 4,5-dicarboxylic acid derivatives of the lower alkyl ethers of vitamin B6 may be obtained by treating such ethers with barium permanganate, and recovering the said dicarboxylic acid derivative. The compounds have the formula

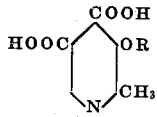

wherein R is a lower alkyl radical. Such derivatives can be used in the synthesis of vitamin B6, or its related compounds.

The following example illustrates one method of carrying out the present invention, but it is to be understood that the example is given by way of illustration and not of limitation.

Example 12.5 cc. of 0.1 molar barium permanganate is added, at first in small portions, finally in larger amounts, to a solution of the methyl ether of vitamin B6 (obtained by treating 105 mgms. of vitamin B6 base with a solution of diazo methane for example, as disclosed in our co-pending application Serial No. 247,479, filed December 23, 1938) in 5 cc. of water. The mixture is allowed to stand over night at room temperature, and the next morning the excess barium permanganate is decomposed by the addition of ethyl alcohol. The manganese dioxide is removed and well washed. The combined washings and the main filtrate are quantitatively freed of barium ion by means of sulfuric acid. The barium sulfate precipitate is removed, and the liquor is concentrated to a small volume, the dicarboxylic derivative of the methyl ether of vitamin B6 separating out in crystalline form. The crystals are recrystallized from water or water-acetone mixtures, and have a melting point of 213–215° C.

| Analysis | C | H |
|---|---|---|
| Calc. for $C_9H_9O_5N$ | 51.16 | 4.30 |
| Found | 51.07 | 4.48 |

In a similar manner, dicarboxylic acid derivatives of ethers higher than the methyl ether may be obtained, for example of the ethyl ether, etc. Other modifications may be made in carrying out the present invention without departing from the spirit and scope thereof, and we are to be limited only by the appended claims.

We claim:

1. The process comprising reacting a lower alkyl ether of vitamin B6 with barium permanganate, and recovering the dicarboxylic acid derivative of said lower ether.

2. The process comprising reacting an aqueous solution of the methyl ether of vitamin B6 with barium permanganate, removing the barium ion, and recovering the dicarboxylic acid derivative of the methyl ether of vitamin B6.

3. The process comprising reacting an aqueous solution of the methyl ether of vitamin B6 with barium permanganate, treating the reaction mass with ethyl alcohol, removing the barium ion by means of sulfuric acid and recovering the dicarboxylic acid derivative of the methyl ether of vitamin B6.

4. An oxidation product of a lower alkyl ether of vitamin B6, being further defined as containing two and not more than two carboxy groups and being of the chemical composition $$C_8H_7O_5N.(CH_2)_n$$

wherein $n$ is an integer.

JOHN C. KERESZTESY.
JOSEPH R. STEVENS.